3,193,538
COPOLYMERS OF BIS(HALOMETHYL) AROMATIC COMPOUNDS AND A VINYLIDENE MONOMER
Peter J. Canterino and Jack E. Cook, Bartlesville, Okla., assignors to Phillips Petroleum Company, a corporation of Delaware
No Drawing. Filed Nov. 6, 1959, Ser. No. 851,239
10 Claims. (Cl. 260—86.3)

This invention relates to novel polymers. In one of its aspects, the invention relates to novel polymers prepared from bis(halomethyl) aromatic compounds and vinylidene monomers. In another of its aspects, the invention relates to the preparation of novel polymers by a reaction of a bis(halomethyl) aromatic compound, a vinylidene monomer and a metal. In a further aspect of the invention, it relates to the preparation of polymers by a reaction of a bis(halomethyl) aromatic compound, a vinylidene monomer, and a metal in the presence of an alcohol diluent. In a still further aspect of the invention, it relates to novel polymers of bis(halomethyl) aromatic compounds and vinylidene monomers which are soluble in hydrocarbon solvents and which are fusible and, therefore, readily molded and extruded into various forms and shapes including sheets and fibers.

It has now been discovered that polymers or plastics having high melting points and excellent tensile values which can be readily molded are obtained from the interaction of a bis(halomethyl) aromatic compound, a vinylidene monomer, and a metal, the reaction being effected in an alcohol diluent.

The preparation of polymers of o- and p-xylene is well known and numerous studies have been made to clarify the mechanisms involved in developing reactive monomers of the o- and p-xylylene type. However, the polymeric products obtained from these monomers have had little commercial interest because of their insolubility and infusibility, it being substantially impossible to utilize them in the production of molded objects for these reasons. Attempts to copolymerize these compounds with vinylidene monomers have heretofore been unsuccessful. While much of the work reported in the prior art is related to studies involving xylylenes prepared by pyrolytic procedures from o- and p-xylene or derivatives thereof, polyphenyleneethylenes have also been prepared from p-xylylene dichloride using the familiar Wurtz reaction. These polymers are also insoluble and infusible.

In view of the foregoing, it is significant that there have been discovered the new polymers, prepared as stated, which are soluble in hydrocarbon solvents and which are fusible. Since the new polymers or plastics have high tensile strength and extremely high melting temperatures, they are suited for use in the fabrication of articles which can be made to withstand considerable stress at elevated temperatures.

It is an object of this invention to prepare a novel polymer. It is a further object of this invention to prepare a plastic or polymer from a bis(halomethyl) aromatic compound and a vinylidene monomer. It is still a further object of the invention to provide a medium for the interaction of a bis(halomethyl) aromatic compound, a vinylidene monomer, and a metal to form a novel polymer which is hydrocarbon soluble, fusible, and which has a high tensile strength and high melting temperature rendering it suitable for use in the fabrication of articles capable of withstanding considerable stress at elevated temperatures.

Other aspects, objects, and the several advantages of this invention are apparent from a study of the disclosure and the appended claims.

According to this invention, there are provided novel plastics resulting from reaction of a bis(halomethyl) aromatic compound, a vinylidene monomer, and a metal, said reaction being effected in an alcohol. Still according to the invention, the metal used in the reaction and now preferred is selected from those which, in the electromotive series, are above nickel, i.e., the alkali metals, the alkaline earth metals, magnesium, aluminum, manganese, zinc, chromium, iron, and cadmium. Now especially preferred are the metals zinc and aluminum.

Generally, the ingredients of the reaction are charged to a reactor which is maintained at a temperature in the approximate range of 25 to 150° C. for about 1 to 100 hours. Generally, the system is maintained under a pressure sufficient to maintain a liquid phase.

The bis(halomethyl) aromatic compounds employed include compounds of the general type $CH_2XZCH_2X$ in which X is a halogen selected from the group consisting of chlorine, bromine, and iodine and Z is an aromatic structure. The $—CH_2X$ groups are so placed on the aromatic structure that on removal of the X atoms, a quinonoid structure can be formed by rearrangement of the electronic distribution in the cyclic portion of the molecule. For example, in the bis(halomethyl) benzenes useful in the present invention, the halomethyl groups will be in either the ortho or para positions with respect to each other on the benzene ring. In the bis(halomethyl) napthalenes, these groups can be in the 1,4- or 2,3-positions on a single ring of the molecule or they can be in the 2,6- or 3,7-positions. Similarly, compounds containing annular nitrogen are applicable in the practice of the invention if the above-mentioned requirement is met. For example, 2,5- or 3,6-dihalomethylpyridines can be used or dihalomethylquinolines capable of forming quinonoid structures by removal of the halogens from the halomethyl groups can be used.

Examples of compounds of the above type are:

p-Xylene dichloride
o-Xylene dichloride
1,4-bis(chloromethyl) naphthalene
2,3-bis(chloromethyl) naphthalene
2,6-bis(chloromethyl) naphthalene
3,7-bis(chloromethyl) naphthalene
2,5-bis(chloromethyl) pyridine
2,3-bis(chloromethyl) pyridine
5,8-bis(chloromethyl) quinoline
6,7-bis(chloromethyl) quinoline
2,3-bis(chloromethyl) quinoline
3,7-bis(chloromethyl) quinoline and the like. These compounds contain 8–12 carbon atoms. The presence of an inert substituent or a ring carbon unoccupied by a halomethyl group can be permitted to the extent of one per ring and preferably is only alkyl group not over four carbons or halogen, in which event, total carbons can be 20, typical compounds being:

2-methyl-p-xylylene dichloride
3-methyl-o-xylylene dichloride
4-methyl-o-xylylene dichloride
2-ethyl-p-xylylene dichloride
4-isopropyl-o-xylylene dichloride
1,4-bis(chloromethyl)-2-methylnaphthalene
2,5-bis(chloromethyl)-4-ethylpyridine
5,8-bis(chloromethyl)-7-t-butylquinoline
2,3-bis(chloromethyl)-8-ethylquinoline
2-chloro-p-xylylene dichloride
3-bromo-o-xylylene dichloride
4-iodo-o-xylylene dichloride
2-fluoro-p-xylylene dichloride and the like.

The term "aromatic" includes structure containing annular nitrogen atom, typified by pyridine and quinoline nuclei.

The vinylidene monomers employed include compounds containing the group $CH_2=C=$. Examples of such compounds include:

Styrene
Butadiene
Vinylpyridine
Acrylonitrile
Methyl acrylate
Ethyl acrylate
Methyl methyacrylate
Vinylnaphthalene
Vinylquinoline and the like. The amount of vinylidene monomers used can vary over a fairly broad range and will generally be between about 0.1 and 10.0 mols per mol of bis(halomethyl) aromatic compound. Generally, the vinylidene monomers are selected from the group consisting of vinylidene aromatics such as styrene, conjugated diolefins such as 1,3-butadiene, esters of acrylic and methacrylic acids such as methyl acrylate, ethyl, acrylate, and methyl methyacrylate, and the like.

The alcohols used will contain up to and including ten carbon atoms. Examples of suitable compounds include:

Methanol
Ethanol
Propanol
Isopropanol
n-Butyl alcohol
1-methylpropanol
Tert-butyl alcohol
Cyclohexanol
2,4-dimethylhexan-1-ol
n-Decanol and the like. The amount of alcohol used will preferably be sufficient to dissolve the bis(halomethyl) aromatic compound although lesser amounts can be used if desired. Mixtures of alcohol with hydrocarbons can be used if desired although with somewhat reduced yields. Usually, the mixture will contain not less than 50 volume percent alcohol. Other alcohols which, however, are not now preferred are polyhydric alcohols such as ethylene glycol.

The metals used and identified above, are charged in pulverulent form, preferably 100 mesh or finer. The amount of metal used will generally be one equivalent of metal for each equivalent of halogen. For example, when operating with zinc, one mol of metal is added for each mol of bis(halomethyl) aromatic; when operating with aluminum, 2 mols of metal for each 3 mols of bis(halomethyl) aromatic; etc. Somewhat greater amounts can be used when desired.

For the preparation of the novel plastics of the present invention, the bis(halomethyl) aromatic compound is charged along with the alcohol and the mixture agitated to effect solution. The vinylidene monomer is then added followed by the metal, after which the reactor is sealed and the temperature adjusted to the operating range. Agitation of the systems is provided, either by a mechanical stirring device or by rocking the reactor. At the end of the reaction period the contents of the reactor are filtered to recover the polymer. The solids are digested with a suitable solvent for the metal such as concentrated hydrochloric acid, after which the polymer is collected in a filter and washed, preferably with water followed by methanol. It is usually desirable to break up the filter cake, say, in a comminuting device such as Waring Blendor, conducting this operation in a wash liquid such as methanol after which the polymer is collected on a filter and dried.

Molding of the polymer is effected at temperatures above about 400° F., preferably between 500 and 700° F.

*Example I*

To each of seven 32 ounce bottles was charged 17 grams of p-xylylene dichloride, 10.4 grams of styrene, 6.5 grams of zinc dust, and 500 ml. of methanol. After flushing with nitrogen, the bottles were capped and placed in a 50° C. bath in which they were tumbled over a weekend (about 65 hours). The contents of the bottles were then removed and the polymer collected on a filter, after which the entire mass was heated on a steam bath with concentrated hydrochloric acid for two hours. The white residue was removed on a filter, washed with water, followed by methanol, after which it was comminuted in a Waring Blendor with about 500 ml. methanol. After filtering, the polymer was again washed with methanol and dried in a vacuum oven at 60° C. overnight. The yield was 56.1 grams. A portion of this polymer was molded at a temperature of 574° F. and a pressure of 35,000 p.s.i.g. to provide test strips for evaluations. Properties found on this material were as follows:

Specific gravity _____ 1.08
Hardness (Shore D) _____ 85
Tensile at yield (p.s.i.) _____ 7,383
Elongation at break (percent) _____ 16
Zero strength temperature _____° F__ 339
Soluble in tetralin at 392° F.

Specific gravity was determined by placing a pea-sized specimen cut from a compression molded slab of the polymer in a 50-ml., glass-stoppered graduate. Carbon tetrachloride and methyl cyclohexane were added to the graduate from burettes in proportions such that the specimen is suspended in the solution. During the addition of the liquids, the graduate is shaken to secure thorough mixing. When the mixture first suspends the specimen, a portion of the liquid is transferred to a small test tube and placed on the platform of a Westphal balance and the glass bob lowered therein. With the temperature shown by the thermometer in the bob in the range 73–78° F., the balance is adjusted until the pointer is at zero. The value shown on the scale is taken as the specific gravity.

Hardness was determined using a Shore durometer, Type D, applied according to ASTM Method D676–55T.

Tensile strength and elongation were determined according to ASTM Method D638–52T using compression molded specimens and a crosshead speed of 0.2 inch/minute. Temperature was 73±2° F.

Zero strength temperature was measured by a test which is essentially that described by Islyn Thomas, Injection Molding of Plastics, Reinhold Publishing Corporation, 504 (1947).

The specimens used are die cut from 4–5 mil film using a Type C die (ASTM D412–51T), and are 4.5 inches long and 0.25 inch wide in the center test section. Approximately one inch is cut from each end to provide a specimen about 2.5 inches in length. The specimen is hung vertically from a spring clip attached to the cover of a double walled cylindrical glass heating chamber in which there is a heater and a blower, the blower serving to circulate air over the small cone heater and upward past the specimen and downward through the annular space between the inner and outer glass walls of the chamber and back to the blower. A small inverted metal cone deflector is supported over the heater to prevent a direct blast of hot air on the specimen and to prevent radiation of heat thereto. A 27.7 gram weight is attached to the lower end of the specimen by a second spring clip. A movable 1-inch scale which can be moved along the deflector support is used to detect elongation of the specimen and a thermometer mounted adjacent to the specimen measures the temperature.

When the specimen is mounted in the apparatus, the heat is turned on and the blower started. The heater is adjusted to raise the temperature at a rate of 2° F./minute. The temperature at which the specimen has elongated one inch is recorded as the zero or no-strength temperature.

Solubility was determined by placing a small piece (about 0.01 gram) of resin cut from a compression molded specimen in about 30 ml. of tetralin and heating. The sample dissolved completely at 392° F. and remained in solution when cooled.

Example II

To a 32-ounce bottle was charged 17.5 grams p-xylylene dichloride, 500 ml. methanol, 2 ml. methyl acrylate, and 13 grams zinc dust. The bottle was flushed with nitrogen, capped and tumbled at 50° C. for 89 hours, after which the reaction mixture was filtered and the solids heated on a steam bath with concentrated hydrochloric acid for two hours. The polymer was recovered on a filter, washed with water and methanol, and comminuted in a Waring Blendor with 400 ml. methanol, after which it was again removed on a filter and washed with methanol. The product was dried in a vacuum oven at 60° C. overnight. Yield was 14.4 grams. In a test for solubility, the product was dissolved in tetralin at 200° C.

Example III

In a run made as in Example II, the charge consisted of 17.5 grams p-xylylene dichloride, 2 ml. styrene, 500 ml. methanol, and 5.4 grams aluminum powder. After the reaction was ended, the product was recovered as previously described, with a yield of 11.1 grams.

From the foregoing, it is evident that polymers having a high zero strength temperature, e.g., of the order of 300° F. and higher can be prepared which are soluble in a hydrocarbon solvent, e.g., tetralin.

Example IV

Into each of four 28 ounce bottles was introduced the following charge:

| | |
|---|---|
| Zinc dust _____grams__ | 13 |
| p-Xylene dichloride _____do____ | 35 |
| Methyl methacrylate _____do____ | 20 |
| Methanol _____ml__ | 500 |

The bottles were capped and placed in a bath maintained at a temperature of 50° C., where they were rotated for 21 hours. The reaction product, a tough rubbery material, was recovered on a filter, steeped in concentrated hydrochloric acid, washed twice with water and three times with methanol, and dried overnight under vacuum. A total of 77.8 grams of dry polymer was obtained. This product was completely soluble in boiling tetralin and was moldable at about 550° F. Evaluation data are shown below:

| | |
|---|---|
| Specific gravity _____ | 1.1167 |
| Shore D hardness _____ | 85 |
| Tensile at yield, p.s.i. _____ | 3523 |
| Elongation at break, percent _____ | 2 |
| Zero strength temperature, ° F. _____ | 280 |

The methods used for determination of the foregoing physical properties were the same as those presented for obtaining the values presented in Example I.

Reasonable variation and modification are possible within the scope of the foregoing disclosure and the appended claims to the invention, the essence of which is that novel polymers having desirable properties as above indicated can be prepared by a novel process which comprises the reaction of a bis(halomethyl) aromatic compound, a vinylidene monomer, and a metal in the presence of an alcohol diluent.

We claim:

1. A polymer prepared by reacting a bis(halomethyl) aromatic compound capable of forming a quinonoid structure on removal of the halo atoms selected from the group consisting of bis(halomethyl) benzenes, bis(halomethyl) naphthalenes, bis(halomethyl) pyridines, and bis(halomethyl) quinalines by dissolving said compound and a vinylidene monomer selected from the group consisting of styrene, butadiene, vinyl pyridine, acrylonitrile, methyl acrylate, ethyl acrylate, methyl methacrylate, vinyl naphthalene, and vinyl quinoline in an alcohol selected from the group consisting of methanol, ethanol, propanol, isopropanol, n-butyl alcohol, 1-methylpropanol, tert-butyl alcohol, cyclohexanol, 2,4-dimethylhexan-1-ol, and n-decanol, and contacting the resulting solution with a metal capable of acting as a catalyst selected from the group consisting of the alkali metals, the alkaline earth metals, magnesium, aluminum, manganese, zinc, chromium, iron and cadmium.

2. A polymer according to claim 1 wherein the compound is a bis(halomethyl) benzene and the vinylidene monomer is styrene.

3. A polymer according to claim 1 wherein the compound is a bis(halomethyl) benzene and the vinylidene monomer is methyl acrylate.

4. A process for the preparation of a polymer which comprises reacting together a bis(halomethyl) aromatic compound capable of forming a quinonoid structure on removal of the halo atoms selected from the group consisting of bis(halomethyl) benzenes, bis(halomethyl) naphthalenes, bis(halomethyl) pyridines, and bis(halomethyl) quinolines, a vinylidene monomer selected from the group consisting of styrene, butadiene, vinyl pyridine, acrylonitrile, methyl acrylate, ethyl acrylate, methyl methacrylate, vinyl naphthalene, and vinyl quinoline, in an alcohol selected from the group consisting of methanol, ethanol, propanol, isopropanol, n-butyl alcohol, 1-methylpropanol, tert-butyl alcohol, cyclohexanol, 2,4-dimethylhexan-1-ol, and n-decanol in the presence of a metal selected from the group consisting of the alkali metals, the alkaline earth metals, magnesium, aluminum, manganese, zinc, chromium, iron, and cadmium.

5. A process according to claim 4 wherein the bis(halomethyl) compound is a bis(halomethyl) benzene and the vinylidene monomer is styrene.

6. A process according to claim 4 wherein the bis(halomethyl) compound is a bis(halomethyl) benzene and the vinylidene monomer is methyl acrylate.

7. A process for the preparation of a polymer which comprises reacting together para-xylylene dichloride and styrene in the presence of zinc dust and methanol for a time sufficient to form a desired amount of polymer.

8. A process of forming a polymer which comprises reacting together para-xylylene dichloride and methyl acrylate in the presence of zinc dust for a time sufficient to form a desired amount of polymer.

9. A process of forming a polymer which comprises reacting together para-xylylene dichloride and styrene in the presence of methanol and aluminum powder for a time sufficient to form a desired amount of polymer.

10. A polymer prepared by reacting para-xylylene dichloride and styrene in the presence of methanol diluent and zinc dust, said polymer having the following properties:

| | |
|---|---|
| Density _____ | 1.08 |
| Hardness (Shore D) _____ | 85 |
| Tensile (p.s.i.) _____ | 7,383 |
| Elongation (percent) _____ | 16 |
| Zero strength temperature _____° F__ | 339 |
| Soluble in tetralin at 392° F. | |

References Cited by the Examiner

UNITED STATES PATENTS

| | | | |
|---|---|---|---|
| 1,683,402 | 9/28 | Ostromislensky _____ | 260—93.5 |
| 2,291,415 | 7/42 | Sparks et al. _____ | 260—93.5 |
| 2,446,430 | 8/48 | Norton _____ | 204—163 |
| 2,603,655 | 7/52 | Strain _____ | 260—346.8 |
| 2,830,078 | 4/58 | Fekete _____ | 260—86.1 |

OTHER REFERENCES

Schildknecht: "Vinyl & Related Polymers," John Wiley & Sons Inc., New York (1952).

JOSEPH L. SCHOFER, *Primary Examiner.*

HAROLD N. BURSTEIN, PHILIP MANGAN, LEON J. BERCOVITZ, *Examiners.*